UNITED STATES PATENT OFFICE.

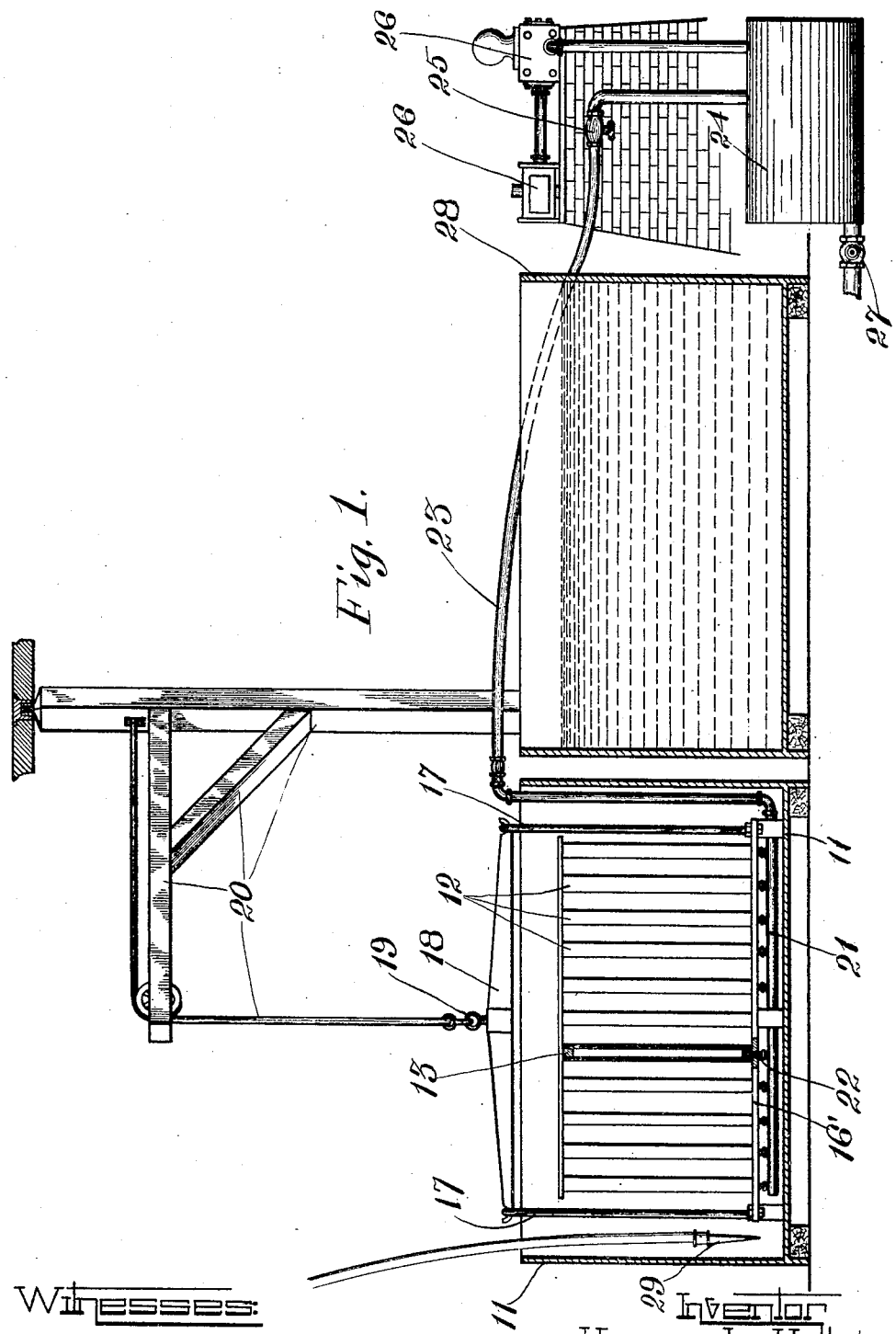

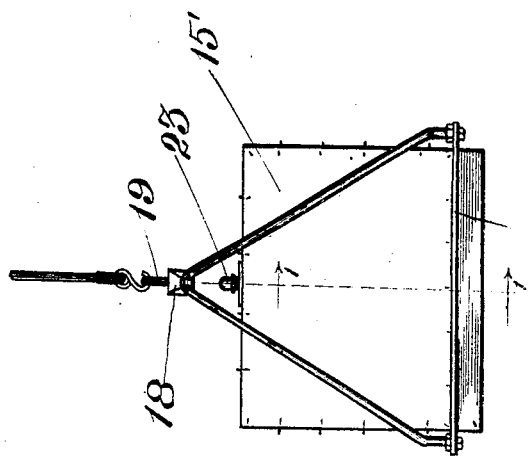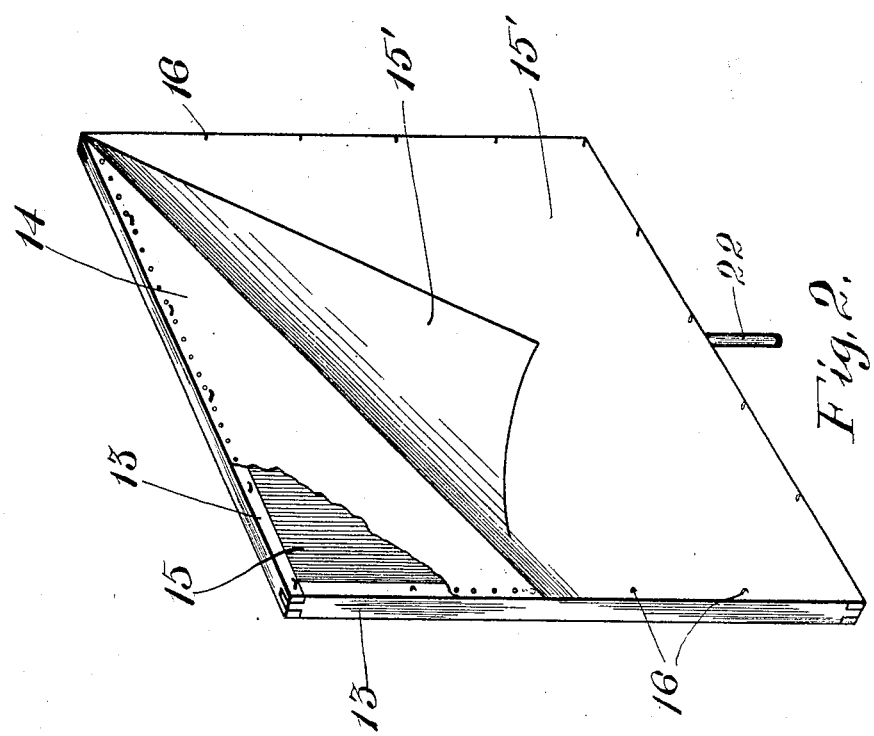

HENRY L. HOLLIS, OF CHICAGO, ILLINOIS.

FILTERING SYSTEM.

No. 808,924.　　　　Specification of Letters Patent.　　　　Patented Jan. 2, 1906.

Application filed July 2, 1904. Serial No. 215,090.

*To all whom it may concern:*

Be it known that I, HENRY L. HOLLIS, a citizen of the United States, residing at Chicago, in the county of Cook and State of Illinois, have invented a certain new and useful Improvement in Filtering Systems, of which the following is a full, clear, concise, and exact description, reference being had to the accompanying drawings, forming a part of this specification.

My invention relates to filtering apparatus which may be used for the filtration of a great variety of liquids or fluids, and I have herein illustrated the invention to be employed in metallurgical operations—such, for instance, as the well-known cyanid process.

The object of my invention is to secure the convenient removal from the filtering surface or wall of the solid material separated in filtering in an inexpensive and effective manner.

My invention provides means such that the filtering apparatus may be employed almost continuously, there being but slight interruptions required for the purpose of cleaning the filtering-surfaces My invention consists in the apparatus hereinafter set forth, and finally embodied in the appended claims.

In carrying out my invention I employ a movable filtering apparatus, the filter proper consisting of one or more closed compartments or filter-chambers, these chambers being provided with filtering surfaces or walls of canvas or duck or other suitable material. If a number of compartments are employed, these are preferably connected by pipes with a pump or air-reservoir or other means for exhausting the air and fluid from the interior of the chambers. Over each of the filtering-surfaces of the filter proper, and completely covering the same is attached, by means of hooks or otherwise, a piece of pervious material—such, for instance, as thin gauze-like cotton cloth. Upon exhausting the air from the inside of the filtering-chambers the detachable cloths are drawn against the filtering walls or surfaces. The filtering-chambers are immersed in a suitable receptacle containing the liquid to be filtered, the fluid being drawn through the filter-walls and the solid material being collected on the detachable screens and held there partly by suction and partly by its own consistency. After the filtration has proceeded until sufficient material has accumulated on the detachable cloths the whole filter proper is removed from this receptacle, (the suction being continued.) If so desired, the filter may then be immersed in a second receptacle containing comparatively clean water, and by continuing the suction this water is drawn through the material on the screen, thereby cleaning this material from the liquid with which it was previously intermingled and at the same time practically all of the fluid from the material to be filtered is recovered and retained. After thus being cleaned the filter proper is removed from this washing-receptacle and the detachable cloths, with the adhering separated material are removed from the filtering-surfaces. Clean cloths are attached to the filter-walls in place of those removed, and the foregoing process is repeated. The cloths which are removed may be cleaned and then used again in the same way. In cases where the solid material in suspension settles quickly the liquid may be agitated either before or during the filtration process by means of compressed air blown into the liquid, thus securing a homogeneous mixture of the material. In cases where it is not necessary to clean the separated solid matter or to save all of the fluid from the first bath the treatment of washing in the second receptacle may be omitted.

My invention will be more clearly understood by reference to the accompanying drawings, in which—

Figure 1 illustrates in a general way the arrangement of the apparatus to be employed. Fig. 2 illustrates in a perspective view one of the filter-chambers and its detachable mantle or screen, and Fig. 3 shows an end view of the filter proper and the sling by means of which it may be removed from the receptacles employed.

The same reference characters indicate the same parts in all of the drawings.

In a preferred embodiment of my invention a suitable receptacle 11 is more or less completely filled with the fluid to be filtered, this fluid containing solid matter in suspension. The filter proper comprises a series of filter-chambers 12 12, the construction of these chambers being clearly indicated in Fig. 2. Each chamber is provided with a frame 13, to the sides of which are fastened the filter-walls 14 and 15. These filter-walls may be made of any suitable material, and in carrying out the well-known cyanid process I have found it desirable to employ canvas or duck walls tacked to the frame 13, as shown. Each of the filter-walls is provided with a detachable cloth or screen 15' of pervious material, the purpose of these screens being, as before stated, to permit readily the passage of fluid to the filter-walls, but to collect the solid material until its accumulation begins to interfere with the filtering process, when the cloths may be removed with the adhering material and fresh cloths inserted in their place. A series of small hooks or points 16 is provided near the periphery of the filter-wall, upon which the detachable cloths may be hooked to hold them in place until the filtering operation has begun. The filter-chambers are mounted upon a frame 16', this frame being suspended from the slings 17 17. The cross-bar 18 is provided with an eyebolt 19, by means of which the crane 20 may lift the entire filter from the receptacle 11, as will hereinafter be more fully explained.

Fig. 1 shows one of the filter-chambers in cross-section—as, for instance, on the line 1 1 of Fig. 3. This cross-sectional view shows the filter-walls and the adhering screens in place. An iron pipe 21 is provided with connections to the various filter-chambers, as indicated at 22. A flexible tube or hose 23 connects the interior of all of the filter-chambers with a reservoir 24, the valve 25 serving to close the tube when desired. The air or vacuum pump 26 serves to withdraw air from the upper part of the reservoir 25, thereby creating a suction which serves to draw the fluid from the tank 11 through the filter-walls and by way of the hose 23 to the reservoir 24, from which the fluid may be withdrawn at suitable intervals by means of the valve 27.

In carrying out the filtering operation the suction is continued until a considerable quantity of the solid material has accumulated on the outer surfaces of the detachable screens or cloths, when the crane is brought into operation to remove the entire filter proper from the tank 11 and to transfer it to the washing tank or receptacle 28. This tank contains water for washing purposes. The suction is continued until after the filter proper has been immersed in the water, whereupon a portion of the water is drawn through the filter-walls, thereby cleansing the solid matter collected on the outer surface and saving also the fluid intermingled with the accumulated deposit. If it is unnecessary or undesirable to wash the accumulated deposit in this way or to save all of the fluid, the washing operation may be dispensed with and the outer cloths or screens be at once removed from the filtering-surface when the filter is withdrawn from the tank 11. Upon removing the screens to which the accumulated deposit adheres fresh cloths are hooked upon the filter-chamber in their place, and upon causing a decrease of pressure in the filter-chambers the screens are drawn into contact with the filter-walls, whereupon the filter is again immersed in the tank 11 and the operations again repeated.

I have found it desirable in certain instances to provide a nozzle 29 for injecting compressed air into the liquid for the purpose of agitating in order to present a homogeneous material for the operation of the filter-walls.

In Fig. 3 there is shown an end view of the filter proper and the sling by means of which the filter may be withdrawn from the receptacles in which it is immersed.

While I have herein described a preferred embodiment of the apparatus for carrying out this process, I do not wish to be limited to the precise disclosures herein described; but, Having explained my invention, I claim as new and desire to secure by Letters Patent—

1. In a system of exhaust filtration, the combination with a receptacle containing the material to be filtered, of a filter-chamber in said receptacle, a pervious cloth adjacent to the outer surface of the filter-wall, and means for detachably securing said pervious cloth in place.

2. In a system of filtration, the combination with a filter-chamber, a detachable pervious screen adjacent to the surface of a filter-wall of said chamber, means for supplying material to be filtered to one side of the wall of said chamber, and means for reducing the pressure upon the other side of said wall.

3. In a system of filtration, the combination with a filter-chamber, a detachable pervious screen adjacent to the surface of a filter-wall of said chamber, means for supplying material to be filtered to one side of the wall of said chamber, and means for withdrawing fluid from said filter-chamber.

4. In a system of exhaust filtration, the combination with a suitable receptacle containing the material to be filtered, of a filter-chamber in said receptacle, a detachable pervious screen adjacent to the outer surface of a filter-wall of said chamber, means for withdrawing the fluid from the interior of said filter-chamber, and means for removing said filter-chamber from the receptacle.

5. In a system of exhaust filtration, the combination with a suitable receptacle containing the material to be filtered, of a filter-chamber in said receptacle, a detachable pervious screen adjacent to the outer surface of a filter-wall of said chamber, means for withdrawing the fluid from the interior of said filter-chamber, means for removing said filter-chamber from the receptacle, and means for agitating the material within said receptacle.

6. In a system of filtration, the combination with a receptacle containing the material to be filtered, a filter proper in said receptacle, a detachable screen adjacent to a filter-wall of said filter, a pump for producing a suction to cause the passage of fluid successively through said screen and said filter-wall, means for collecting the filtered fluid, a second receptacle containing water for washing purposes, and means for moving said filter proper from one receptacle to the other.

7. In a system of filtration, the combination with a suitable filter proper, of a detachable screen adjacent to a filter-wall of said filter, and means for causing a difference in pressure on the two sides of said filter-wall.

8. In a system of filtration, the combination with a suitable filter proper, of a detachable screen adjacent to a filter-wall of said filter, and means for causing a decrease in the pressure on the opposite side of the filter-wall from that upon which the detachable screen is placed.

9. In a filtering system, the combination with a filter-wall, of a detachable screen covering the outer surface of the filter-wall, and means for reducing the pressure on the inner side of the filter-wall.

10. In a system of exhaust filtration, the combination with a receptacle containing the material to be filtered, of a second receptacle containing water for washing purposes, a filter proper comprising a plurality of filter-chambers each having suitable canvas filter-walls, a detachable gauze-like cloth adjacent to the outer surface of each of said filter-walls, means for holding said cloths in place during the filtering operation, means for withdrawing air and fluid from the interior of said filter-walls, and means for transferring said filter proper from one receptacle to the other and for removing it from both, whereupon said gauze-like cloths may be changed, substantially as described.

11. In a system of exhaust filtration, the combination with a receptacle containing the material to be filtered, of a filter proper comprising a plurality of filter-chambers each having suitable canvas filter-walls, a detachable gauze-like screen adjacent to the outer surface of each of said filter-walls, means for holding said cloths in place during the filtering operation and prior to immersion in the material to be filtered, and means for creating suction within the filter-chambers.

12. In a system of exhaust filtration, the combination with a receptacle containing the material to be filtered, of a second receptacle containing water for washing purposes, a filter proper comprising a plurality of filter-chambers each having suitable filter-walls, a detachable gauze-like cloth adjacent to the outer surface of each of said filter-walls, means for holding said cloths in place during the filtering operation, means for withdrawing air and fluid from the interior of said filter-walls, and means for transferring said filter proper from one receptacle to the other and for removing it from both, whereupon said gauze-like cloths may be changed, substantially as described.

13. In a system of exhaust filtration, the combination with a receptacle containing the material to be filtered, of a filter proper comprising a plurality of filter-chambers each having suitable filter-walls, a detachable gauze-like screen adjacent to the outer surface of each of said filter-walls, means for holding said cloths in place during the filtering operation and prior to immersion in the material to be filtered, and means for creating suction within the filter-chambers.

14. In a system of exhaust filtration, the combination with a receptacle containing the material to be filtered, of a second receptacle containing water for washing purposes, a filter proper comprising a plurality of filter-chambers each having suitable filter-walls, a detachable gauze-like screen adjacent to the outer surface of each filter-wall, a reservoir, a flexible tube connecting said reservoir with the chambers of said filter proper, a pump for exhausting the air from said reservoir, and means for transferring said filter proper from one receptacle to the other and for removing it from both, whereupon said gauze-like screens may be renewed.

15. In a filtering system, the combination with a tank containing the material to be filtered, of a filtering medium, means for alternately introducing said medium into and removing the same from said tank, means for drawing the contained material through said filtering medium while in the tank, and a screen outside of the filtering medium for removing the solid material from said filtering medium, while said medium is outside the tank.

16. In a filtering system, the combination with a tank for containing the material to be filtered and a water-tank, of a filter, means for introducing and removing the same into and from each of said tanks alternately, and means for drawing the contents of said tanks through the filtering medium into detachable cloth provided with fine meshes external to said filtering medium for removing the solid material from said filtering medium.

17. In a filter, the combination with a filtering medium, of a pipe extending into said medium, a pump connected therewith for intermittently producing a drawing action, and a fine-meshed detachable screen for removing the solid material from said filtering medium, substantially as described.

18. In a filtering system, the combination with a tank for containing the material to be filtered and a tank for containing a cleansing liquid, of a filter, means for introducing and removing the same into and from the first-mentioned tank and for introducing and removing same into and from the second-mentioned tank, means for drawing the material contained in the first-mentioned tank through the filtering medium while the filter is within the tank and for drawing the liquid from the second-mentioned tank through the filter while therein, and a detachable screen for removing the solid material from the filter.

19. In a filtering system, the combination with a suitable filtering medium, of a tube communicating with the interior thereof, a pump for producing an intermittent drawing action within said tube, and a detachable cloth adjacent to the filtering medium to entangle and engage the solid material and for removing the same from the surface of the filtering medium.

20. In a filtering system, the combination with a tank for containing the material to be filtered and a cleansing-fluid tank, of a filter, means for introducing and removing the same into and from said tanks alternately, means for drawing the contents of said tanks through said filter, and a fine-meshed screen for removing foreign substances from the surface of said filter after its removal from the the tank containing the cleansing fluid.

21. In a filter, the combination with a suitable receptacle for the material to be filtered, of a filter proper, means for introducing the same into and removing the same from said receptacle, means for producing a drawing action through said filter while in the receptacle, and a detachable fine-meshed screen outside of the filter through which the fluid must pass before reaching the filtering medium, means for removing said screen with the solid material engaged thereby, and a second screen for substitution in place of that removed.

22. In a filtering system, the combination with a suitable tank for containing the material to be filtered, of a filter comprising a plurality of plates, filtering means carried thereby, a tube communicating with the interior of said filtering means, means for introducing and removing said filter proper into and from said tank, means for drawing the material contained in said tank through said filtering medium and through said tube, and a bodily-removable cleansing-screen outside of said filtering means through which the fluid must be drawn in passing from the tank through said filtering means.

23. In a system of filtration, the combination with a receptacle containing the material to be filtered, of a filter-chamber in said receptacle having pervious stationary side walls, means for creating suction in said filter-chamber, additional pervious side walls for said filter-chamber, and hooks from which said additional walls may be suspended and from which said walls may be readily detached to remove therefrom the accumulated material after filtration.

24. In a system of exhaust filtration, the combination with a receptacle containing the solution to be filtered, of a filter-chamber in said receptacle, said filter-chamber consisting of a frame to the sides of which are permanently secured walls of pervious material, hooks extending from the sides of said frame, and additional side walls of pervious material stretched between said hooks and readily detachable therefrom, whereby the material accumulated on said additional walls after filtration may be removed from the filter-chamber.

In witness whereof I hereunto subscribe my name this 30th day of June, A. D., 1904.

HENRY L. HOLLIS.

Witnesses:
HARVEY L. HANSON,
CHARLES A. BROWN.